US011359732B1

(12) United States Patent
Santi (10) Patent No.: US 11,359,732 B1
(45) Date of Patent: Jun. 14, 2022

(54) METHOD AND MECHANISM FOR SYMMETRICALLY CONTROLLING PRESSURE IN PROCESS CHAMBER

(71) Applicant: APPLIED MATERIALS, INC., Santa Clara, CA (US)

(72) Inventor: David Santi, San Mateo, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 17/224,579

(22) Filed: Apr. 7, 2021

(51) Int. Cl.
*F16K 15/03* (2006.01)
*F16K 47/04* (2006.01)
*F16K 15/18* (2006.01)

(52) U.S. Cl.
CPC ........ *F16K 15/035* (2013.01); *F16K 15/1821* (2021.08); *F16K 47/045* (2013.01); *Y10T 137/87483* (2015.04); *Y10T 137/87515* (2015.04); *Y10T 137/87531* (2015.04)

(58) Field of Classification Search
CPC .. F16K 15/035; F16K 15/1821; F16K 47/045; Y10T 137/7898; Y10T 137/87458; Y10T 137/87483; Y10T 137/87531; Y10T 137/87515; Y10T 137/87467; Y10T 137/87523
See application file for complete search history.

(56) References Cited

U.S. PATENT DOCUMENTS

| | | | | | |
|---|---|---|---|---|---|
| 1,852,918 | A | * | 4/1932 | Chandler | F02M 1/00 137/601.17 |
| 1,872,213 | A | * | 8/1932 | Anderson | F16K 1/223 126/285 R |
| 1,937,597 | A | * | 12/1933 | Schmidt | F16K 11/052 137/599.08 |
| 1,948,840 | A | * | 2/1934 | Biddle | F02D 17/00 251/213 |
| 1,978,127 | A | * | 10/1934 | Downs | F04D 29/464 137/601.11 |
| 2,035,191 | A | * | 3/1936 | Reynolds | F02D 9/00 137/599.18 |
| 2,140,734 | A | * | 12/1938 | Chandler | F02M 1/02 137/599.18 |
| 2,349,727 | A | * | 5/1944 | Hopkins | F16K 1/221 137/552 |
| 3,044,387 | A | * | 7/1962 | Hinden | F24F 13/15 49/77.1 |
| 3,070,345 | A | * | 12/1962 | Knecht | F16K 15/035 251/212 |

(Continued)

*Primary Examiner* — Craig M Schneider
*Assistant Examiner* — Frederick D Soski
(74) *Attorney, Agent, or Firm* — Lowenstein Sandler LLP (57) ABSTRACT

Disclosed herein are embodiments of a value assembly, methods of manufacturing the same, and methods of using the same. In one embodiment, a sensor assembly comprises a housing having a through-bore, a first flap coupled to a first shaft and a second flap coupled to a second shaft, wherein the first shaft and the second shaft are coupled within the housing; and one or more gear assemblies coupled to the first shaft and the second shaft, wherein the gear assemblies are configured to rotate the first flap and the second flap from a first position to a second position to prevent a flow from traversing through the through-bore, and from the second position to the first position to allow the flow to traverse through the through-bore.

15 Claims, 8 Drawing Sheets

(56) References Cited

U.S. PATENT DOCUMENTS

| | | | | |
|---|---|---|---|---|
| 3,196,895 | A * | 7/1965 | Dayus | F24F 13/15 137/270 |
| 3,241,568 | A * | 3/1966 | Mayo, Jr. | F16K 1/223 137/601.06 |
| 3,261,373 | A * | 7/1966 | Ridenour | E06B 7/084 137/601.11 |
| 3,267,962 | A * | 8/1966 | Josephson | F24F 13/15 137/601.11 |
| 3,275,031 | A * | 9/1966 | Alyea | F24F 13/15 137/601.06 |
| 3,495,521 | A * | 2/1970 | Foster | F24F 13/1486 454/319 |
| 3,572,656 | A * | 3/1971 | Oshima | F02M 1/00 261/23.2 |
| 3,604,458 | A * | 9/1971 | Silvey | F16K 1/165 137/601.11 |
| 3,771,559 | A * | 11/1973 | Alley | F16K 1/165 137/601.06 |
| 4,043,358 | A * | 8/1977 | Sliski | F16K 15/038 137/512.1 |
| 4,076,035 | A * | 2/1978 | Frisch | F16K 1/165 137/601.11 |
| 4,241,647 | A * | 12/1980 | Herr | F24F 13/1413 137/601.11 |
| 4,257,451 | A * | 3/1981 | Paton | F16K 15/038 137/512.1 |
| 4,275,762 | A * | 6/1981 | Field | F24F 13/15 137/601.11 |
| 4,658,857 | A * | 4/1987 | Ayres, Jr. | F16K 1/223 137/601.11 |
| 4,744,734 | A * | 5/1988 | Sowards | F04C 28/16 251/228 |
| 5,318,063 | A * | 6/1994 | Muddiman | F16K 15/038 137/454.2 |
| 5,842,919 | A * | 12/1998 | Lyons | F24F 13/15 454/336 |
| 6,273,136 | B1 * | 8/2001 | Steinert | B64D 13/02 137/630 |
| 6,808,163 | B2 * | 10/2004 | Lee | F16K 51/02 251/305 |
| 9,322,338 | B2 * | 4/2016 | Ma | F02D 9/1025 |
| 11,215,496 | B2 * | 1/2022 | Schai | F16K 31/5282 |
| 2002/0148512 | A1 * | 10/2002 | Laney | F16K 1/221 137/601.11 |
| 2003/0052294 | A1 * | 3/2003 | Moore | F16K 1/223 251/305 |
| 2003/0091428 | A1 * | 5/2003 | Schofield | F01D 25/12 415/1 |
| 2009/0056818 | A1 * | 3/2009 | McGonigle | F16K 15/038 137/527 |
| 2010/0282340 | A1 * | 11/2010 | Dehais | F16K 15/038 137/511 |
| 2014/0261733 | A1 * | 9/2014 | Wu | C23C 16/45561 137/15.04 |
| 2015/0267824 | A1 * | 9/2015 | Feng | F16K 15/038 137/12 |
| 2016/0040794 | A1 * | 2/2016 | Minta | F16K 15/035 137/527 |
| 2016/0040799 | A1 * | 2/2016 | Kamp | F16K 15/03 137/15.19 |

* cited by examiner

```
┌─────────────────────────────────────────────────────────────────────┐
│   Obtain sensor data from one or more sensors of a process chamber  │
│                                610                                  │
└─────────────────────────────────────────────────────────────────────┘
                                  │
┌─────────────────────────────────────────────────────────────────────┐
│        Determine a position of the first flap and the second flap   │
│                                620                                  │
└─────────────────────────────────────────────────────────────────────┘
                                  │
┌─────────────────────────────────────────────────────────────────────┐
│ Adjust the position of the first flap and the second based on the determined position │
│                                630                                  │
└─────────────────────────────────────────────────────────────────────┘
```

METHOD AND MECHANISM FOR SYMMETRICALLY CONTROLLING PRESSURE IN PROCESS CHAMBER

TECHNICAL FIELD

Embodiments of the present disclosure relate, in general, to methods and mechanisms for symmetrically controlling pressure in a semiconductor process chamber.

BACKGROUND

Products are produced by performing one or more manufacturing processes using manufacturing equipment. For example, substrate processing equipment is used to produce substrates via substrate manufacturing processes in a substrate processing system. Substrate manufacturing processes include providing fluid flow to one or more chambers of the substrate processing system Controlling a flow rate of the fluid, such as a process gas and cleaning gases, presents a common challenge in manufacturing systems. In some manufacturing systems, process gases (i.e., gases used during semiconductor fabrication processes) and/or cleaning gases (i.e., gases used to clean a manufactured device and/or a chamber used in manufacturing an electronic device) can have precise delivery targets including high mass flow rates (i.e., 500 standard liters per minute or more), as well as the ability to precisely control low flow rates (i.e., 10 standard liters per minute or less). Conventional manufacturing systems often use one or more throttling values to control the mass flow rates of process gases.

SUMMARY

Certain embodiments of the present disclosure relate to a valve assembly including a housing comprising a through-bore, a first flap coupled to a first shaft and a second flap coupled to a second shaft, wherein the first shaft and the second shaft are coupled within the housing, and one or more gear assemblies coupled to the first shaft and the second shaft, wherein the gear assemblies are configured to rotate the first flap and the second flap from a first position to a second position to prevent a flow from traversing through the through-bore, and from the second position to the first position to allow the flow to traverse through the through-bore.

Another aspect of the present disclosure relates to an electronic device manufacturing system, comprising a process chamber, and a flow control apparatus comprising a valve assembly. The value assembly comprises a housing comprising a through-bore, a first flap coupled to a first shaft and a second flap coupled to a second shaft, wherein the first shaft and the second shaft are coupled within the housing, and one or more gear assemblies coupled to the first shaft and the second shaft, wherein the gear assemblies are configured to rotate the first flap and the second flap from a first position to a second position to prevent a flow from traversing through the through-bore, and from the second position to the first position to allow the flow to traverse through the through-bore.

Another aspect of the present disclosure relates to a flow control apparatus. The flow control apparatus includes a gas flow channel defining a gas flow path, a valve assembly configured to modulate gas flow in the gas flow channel, and a processing device operatively coupled to the valve assembly, the processing device being configured to adjust a position of the first flap and the second flap to module the gas flow in the gas flow channel. The valve assembly comprises a housing comprising a through-bore, a first flap coupled to a first shaft and a second flap coupled to a second shaft, wherein the first shaft and the second shaft are coupled within the housing, and one or more gear assemblies coupled to the first shaft and the second shaft, wherein the gear assemblies are configured to rotate the first flap and the second flap from a first position to a second position to prevent a flow from traversing through the through-bore, and from the second position to the first position to allow the flow to traverse through the through-bore.

Another aspect of the present disclosure relates to a method of manufacturing a valve assembly, the method comprises providing a housing comprising a through-bore, coupling a first flap to a first shaft, coupling a second flap to a second shaft, coupling the first shaft and the second shaft to the interior of the housing, and coupling one or more gear assemblies to the first shaft and the second shaft, wherein the gear assemblies are configured to rotate the first flap and the second flap from a first position to a second position to prevent a flow from traversing through the through-bore, and from the second position to the first position to allow the flow to traverse through the through-bore.

BRIEF DESCRIPTION OF DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION OF EMBODIMENTS

Described herein are technologies directed to methods and mechanisms for symmetrically controlling pressure in a semiconductor process chamber. A film can be deposited on a surface of a substrate during a deposition process (e.g., a deposition (CVD) process, an atomic layer deposition (ALD) process, and so forth) performed at a process chamber of a manufacturing system. For example, in a CVD process, the substrate is exposed to one or more precursors, which react on the substrate surface to produce the desired deposit. The film can include one or more layers of materials that are formed during the deposition process, and each layer can include a particular thickness gradient (e.g., changes in the thickness along a layer of the deposited film). For example, a first layer can be formed directly on the surface of the substrate (referred to as a proximal layer or proximal end of the film) and have a first thickness. After the first layer is formed on the surface of the substrate, a second layer having a second thickness can be formed on the first layer. This process continues until the deposition process is completed and a final layer is formed for the film (referred to as the distal layer or distal end of the film). The film can include alternating layers of different materials. For example, the film can include alternating layers of oxide and nitride layers (oxide-nitride-oxide-nitride stack or ONON stack), alternating oxide and polysilicon layers (oxide-polysilicon-oxide-polysilicon stack or OPOP stack), and so forth. The film can then be subjected to, for example, an etch process to form a pattern on the surface of the substrate, a chemical-mechanical polishing (CMP) process to smooth the surface of the film, or any other process necessary to manufacture the finished substrate.

To control pressure in the process chamber, the manufacturing system can include a pump system. The pump system can include one or more pumps and throttle valves, downstream from the process chamber, utilized to evacuate and regulate the pressure of the process chamber, as well as regulate the flow rate of the gasses used during the deposition process. The throttle value can move towards an open position to decrease pressure generate from the pump and to increase the flow rate of the gas(ses), or move towards the closed position to increase the pressure generated from the pump and to decrease the flow rate of the gas(ses).

Existing systems can use different types of throttling values to regulate the flow and pressure in the process chamber. For example, existing systems can use a butterfly value, which is a quarter turn valve that includes a disc connected to a rod. The rod rotates the disc into an open position where the disc is parallel to the flow, and to a closed position where the disc is perpendicular to the flow. Current throttling valves, such as the butterfly value, regulate the flow asymmetrically, which can cause erratic or uneven flow, and pressure buildup on the throttle valve. For example, as the disc of the butterfly valve rotates, one portion of the disc turns to face the process chamber while the opposite portion of the disc turns to face the pump, causing the flow to slant at the throttle valve. This can cause a delay in achieving optimal process chamber pressure and flow rate of a process gas, which can result in deformations in the film.

Aspects and implementations of the present disclosure address these and other shortcoming of existing technology by symmetrically controlling pressure in a semiconductor process chamber. Embodiments described herein relate to a valve assembly adapted for used in a gas flow control apparatus, a system incorporating the same, a method of adapting the valve assembly for such use, and a method of using the valve assembly. The valve assembly can include a housing having a through-bore. Within the housing can be situated a left flap coupled to a first shaft and a right flap coupled to a second shaft. The first shaft and the second shaft can be coupled to the housing. The left flap and the right flap can each be half circle shaped (e.g., a half disc), having a flat top and flat bottom, a half circle side, and a flat side. The flat sides of each flap can be rounded and proximate to each other such that the two flaps form a circular shape when valve assembly is in the closed positon (to prevent gas flow through a gas flow channel). One or more gear assemblies can be coupled to the first shaft and the second shaft. The gear assemblies can be configured to rotate the left flap and the right flap from an open position to a closed position to prevent the gas flow from traversing through the through-bore, and from the closed position to the open position (or one or more partially open positions) to allow the gas flow to traverse through the through-bore.

The first shaft can extend out from the housing and be coupled to an actuator. The actuator can include any mechanical, electrical, or electromechanical device capable of rotating the first shaft. For example, the actuator can include an electric motor, a pneumatic device, a hydraulic device, a magnetic device, a solenoid, and so forth. The actuator can rotate the first shaft in either direction (i.e., clockwise and counterclockwise). Rotating the first shaft can position the left and right flap into the open position (where both flaps are parallel to a flow path of the gas flow), into one or more partially open positions (where both flaps are between being parallel to the flow path and perpendicular to the flow path), and into the closed position (where both flaps are perpendicular to the flow path). In particular, rotating the first shaft rotates the left flap and engages the assemblies to rotate the right flap in a symmetric motion (in a mirror motion via a vertical plane between the left flap and the right flap).

Aspects of the present disclosure result in technological advantages of significant reduction in time required to achieve optimal pressure and flow rate of a process gas in a process chamber during manufacturing of substrates, as well as improvements in energy consumption, and so forth. The design of the valve assembly may also be adapted to minimize turbulence effects of the flow of the process gas, minimize corrosion and depositions on the valve assembly which could hamper performance of the valve assembly, minimize outgassing or leakage to the external environment, maintain vacuum, and retain the fast response of the achieving optimal deposition conditions.

Figure 1:
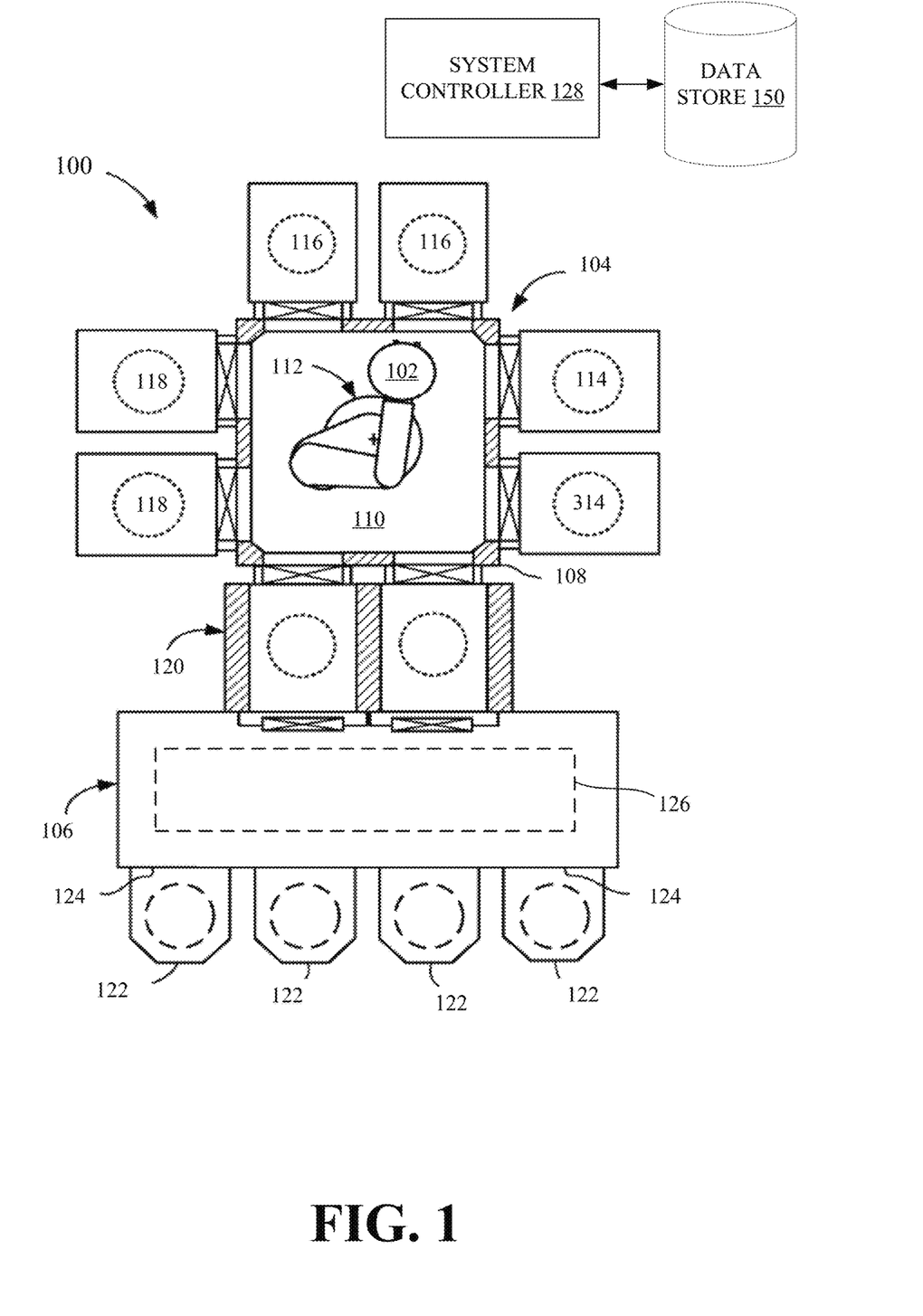
FIG. 1 is a top schematic view of an example manufacturing system, according to certain embodiments.

FIG. 1 is a top schematic view of an example manufacturing system 100, according to aspects of the present disclosure. Manufacturing system 100 can perform one or more processes on a substrate 102. Substrate 102 can be any suitably rigid, fixed-dimension, planar article, such as, e.g., a silicon-containing disc or wafer, a patterned wafer, a glass plate, or the like, suitable for fabricating electronic devices or circuit components thereon.

Manufacturing system 100 can include a process tool 104 and a factory interface 106 coupled to process tool 104. Process tool 104 can include a housing 108 having a transfer chamber 110 therein. Transfer chamber 110 can include one or more process chambers (also referred to as processing chambers) 114, 116, 118 disposed therearound and coupled thereto. Process chambers 114, 116, 118 can be coupled to transfer chamber 110 through respective ports, such as slit valves or the like. Transfer chamber 110 can also include a transfer chamber robot 112 configured to transfer substrate 102 between process chambers 114, 116, 118, load lock 120, etc. Transfer chamber robot 112 can include one or multiple arms where each arm includes one or more end effectors at the end of each arm. The end effector can be configured to handle particular objects, such as wafers.

Process chambers 114, 116, 118 can be adapted to carry out any number of processes on substrates 102. A same or different substrate process can take place in each processing chamber 114, 116, 118. A substrate process can include atomic layer deposition (ALD), physical vapor deposition (PVD), chemical vapor deposition (CVD), etching, annealing, curing, pre-cleaning, metal or metal oxide removal, or the like. Other processes can be carried out on substrates therein. Process chambers 114, 116, 118 can each include one or more sensors configured to capture data for substrate 102 before, after, or during a substrate process. For example, the one or more sensors can be configured to capture spectral data and/or non-spectral data for a portion of substrate 102 during a substrate process. In other or similar embodiments, the one or more sensors can be configured to capture data associated with the environment within process chamber 114, 116, 118 before, after, or during the substrate process. For example, the one or more sensors can be configured to capture data associated with a temperature, a pressure, a gas concentration, etc. of the environment within process chamber 114, 116, 118 during the substrate process.

A load lock 120 can also be coupled to housing 108 and transfer chamber 110. Load lock 320 can be configured to interface with, and be coupled to, transfer chamber 110 on one side and factory interface 106. Load lock 120 can have an environmentally-controlled atmosphere that can be changed from a vacuum environment (wherein substrates can be transferred to and from transfer chamber 110) to at or near atmospheric-pressure inert-gas environment (wherein substrates can be transferred to and from factory interface 106) in some embodiments. Factory interface 106 can be any suitable enclosure, such as, e.g., an Equipment Front End Module (EFEM). Factory interface 306 can be configured to receive substrates 102 from substrate carriers 122 (e.g., Front Opening Unified Pods (FOUPs)) docked at various load ports 124 of factory interface 106. A factory interface robot 126 (shown dotted) can be configured to transfer substrates 302 between carriers (also referred to as containers) 122 and load lock 120. Carriers 122 can be a substrate storage carrier or a replacement part storage carrier.

Manufacturing system 100 can also be connected to a client device (not shown) that is configured to provide information regarding manufacturing system 100 to a user (e.g., an operator). In some embodiments, the client device can provide information to a user of manufacturing system 100 via one or more graphical user interfaces (GUIs). For example, the client device can provide information regarding a target thickness profile for a film to be deposited on a surface of a substrate 102 during a deposition process performed at a process chamber 114, 116, 118 via a GUI. The client device can also provide information regarding a modification to a process recipe in view of a respective set of deposition settings predicted to correspond to the target profile, in accordance with embodiments described herein.

Manufacturing system 100 can also include a system controller 128. System controller 328 can be and/or include a computing device such as a personal computer, a server computer, a programmable logic controller (PLC), a microcontroller, and so on. System controller 128 can include one or more processing devices, which can be general-purpose processing devices such as a microprocessor, central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device can also be one or more special-purpose processing devices such as an application specific integrated circuit (ASIC), a field programmable gate array (FPGA), a digital signal processor (DSP), network processor, or the like. System controller 128 can include a data storage device (e.g., one or more disk drives and/or solid state drives), a main memory, a static memory, a network interface, and/or other components. System controller 128 can execute instructions to perform any one or more of the methodologies and/or embodiments described herein. In some embodiments, system controller 128 can execute instructions to perform one or more operations at manufacturing system 100 in accordance with a process recipe. The instructions can be stored on a computer readable storage medium, which can include the main memory, static memory, secondary storage and/or processing device (during execution of the instructions).

System controller 128 can receive data from sensors included on or within various portions of manufacturing system 100 (e.g., processing chambers 114, 116, 118, transfer chamber 110, load lock 120, etc.). In some embodiments, data received by the system controller 128 can include spectral data and/or non-spectral data for a portion of substrate 102. In other or similar embodiments, data received by the system controller 128 can include data associated with processing substrate 102 at processing chamber 114, 116, 118, as described previously. For purposes of the present description, system controller 128 is described as receiving data from sensors included within process chambers 114, 116, 118. However, system controller 128 can receive data from any portion of manufacturing system 100 and can use data received from the portion in accordance with embodiments described herein. In an illustrative example, system controller 128 can receive data from one or more sensors for process chamber 114, 116, 118 before, after, or during a substrate process at the process chamber 114, 116, 118. Data received from sensors of the various portions of manufacturing system 100 can be stored in a data store 150. Data store 150 can be included as a component within system controller 128 or can be a separate component from system controller 128.

Figure 2:
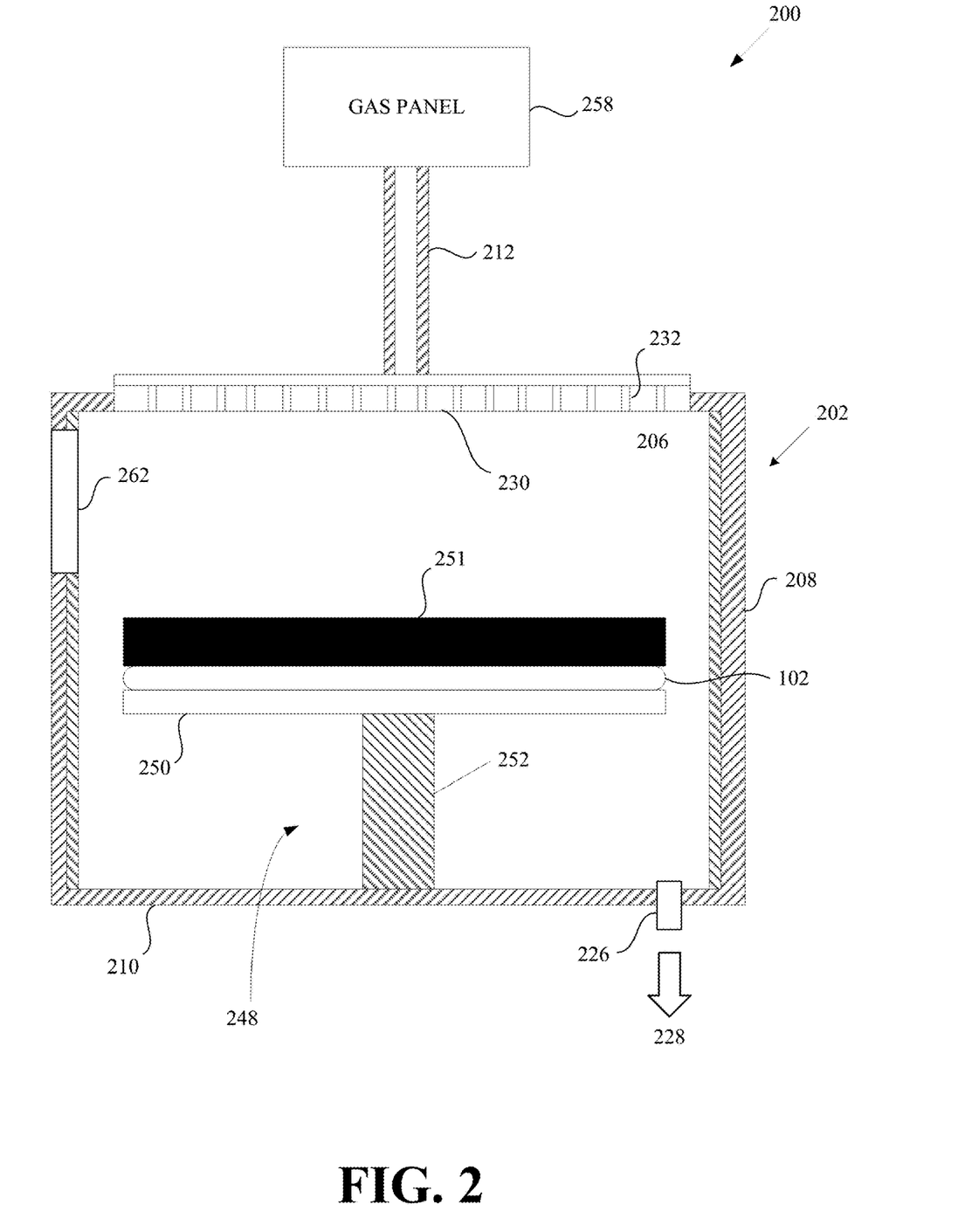
FIG. 2 is a cross-sectional schematic side view of an example process chamber of the example manufacturing system, according to certain embodiments.

FIG. 2 is a cross-sectional schematic side view of a process chamber 200, in accordance with embodiments of the present disclosure. In some embodiments, process chamber 200 can correspond to process chamber 114, 116, 118, described with respect to FIG. 1. Process chamber 200 can be used for processes in which a corrosive plasma environment is provided. For example, the process chamber 200 can be a chamber for a plasma etcher or plasma etch reactor, and so forth. In another example, process chamber can be a chamber for a deposition process, as previously described. In some embodiments, process chamber 200 can be any chamber used in an electronic device manufacturing system.

In one embodiment, the process chamber 200 includes a chamber body 202 and a showerhead 230 that encloses an interior volume 206. The showerhead 230 can include a showerhead base and a showerhead gas distribution plate. Alternatively, the showerhead 230 can be replaced by a lid and a nozzle in some embodiments, or by multiple pie shaped showerhead compartments and plasma generation units in other embodiments. The chamber body 202 can be fabricated from aluminum, stainless steel or other suitable material such as titanium (Ti). The chamber body 202 generally includes sidewalls 208 and a bottom 210. An exhaust port 226 can be defined in the chamber body 202, and can couple the interior volume 206 to a flow control apparatus 228. Flow control apparatus 228 can include one or more pumps and throttle valves utilized to evacuate and regulate the pressure of the interior volume 206 of the process chamber 200.

The showerhead 230 can be supported on the sidewall 208 of the chamber body 202. The showerhead 220 (or lid) can be opened to allow access to the interior volume 206 of the process chamber 200, and can provide a seal for the process chamber 200 while closed. A gas panel 258 can be coupled to the process chamber 200 to provide process and/or cleaning gases, via supply line 212, to the interior volume 206 through the showerhead 230 or lid and nozzle (e.g., through apertures of the showerhead or lid and nozzle). For example, gas panel 258 can provide precursors for materials of a film 251 deposited on a surface of a substrate 102. In some embodiments, a precursor can include a silicon-based precursor or a boron-based precursor. The showerhead 230 can include a gas distribution plate (GDP) and can have multiple gas delivery holes 232 (also referred to as channels) throughout the GDP. A substrate support assembly 248 is disposed in the interior volume 206 of the process chamber 200 below the showerhead 230. The substrate support assembly 248 holds a substrate 102 during processing (e.g., during a deposition process).

In some embodiments, processing chamber 200 can include metrology equipment (not shown) configured to generate in-situ metrology measurements during a process performed at process chamber 200. The metrology equipment can be operatively coupled to the system controller (e.g., system controller 128, as previously described). In some embodiments, the metrology equipment can be configured to generate a metrology measurement value (e.g., a thickness) for film 251 during particular instances of the deposition process. The system controller can generate a thickness profile for film 251 based on the received metrology measurement values from the metrology equipment. In other or similar embodiments, processing chamber 200 does not include metrology equipment. In such embodiments, the system controller can receive one or more metrology measurement values for film 251 after completion of the deposition process at process chamber 200. System controller can determine a deposition rate based on the one or more metrology measurement values and can associate generate the thickness profile for film 251 based on the determined concentration gradient and the determined deposition rate of the deposition process.

Figure 3:
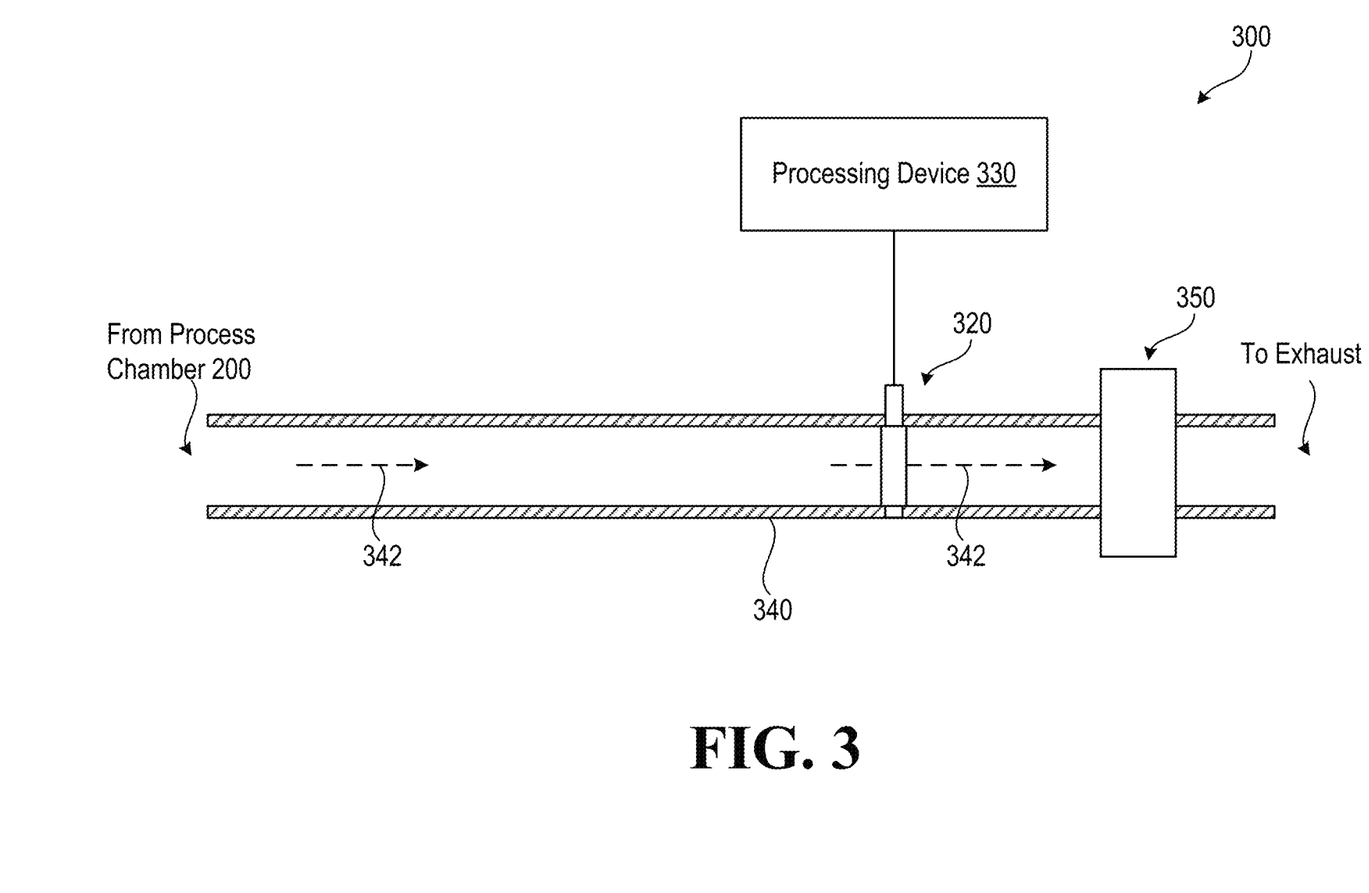
FIG. 3 is a cross-sectional schematic side view of a flow control apparatus, in accordance with embodiments of the present disclosure.

FIG. 3 is a cross-sectional schematic side view of a flow control apparatus 300, in accordance with embodiments of the present disclosure. In some embodiments, flow control apparatus 300 can correspond to flow control apparatus 228, described with respect to FIG. 2. Flow control apparatus 300 can be configured to measure and control a mass flow rate of a process gas and/or a cleaning gas used in a manufacturing system. Flow control apparatus 300 can be coupled to a gas source (e.g., gas panel 258) and process chamber 200 via a gas flow channel 240. Gas flow channel 240 can correspond to the supply line 212 of FIG. 2.

In some embodiments, flow control apparatus 300 can include valve assembly 320, processing device 330, and pump 350. Gas from the gas source flows through process chamber 200 and through flow path 342 defined through gas flow channel 340. The gas flow channel 340 can deliver gas to an open environment (e.g., an exhaust system) or a closed environment (e.g., a building or vehicle ventilation system). In some embodiments, gas flow channel 340 is a gas line, an offshoot channel of a gas line, or a separate component with inlets and outlets fitted to the gas line. Pump 350 can evacuate and regulate the pressure of the interior volume of the process chamber 200.

In some embodiments, valve assembly 310 is configured to restrict the gas flow through flow path 342. In some embodiments, valve assembly 310 includes other components in addition to a valve, such as flow or temperature sensing components. In some embodiments, valve assembly 320 includes a sensor device, which can be configured to generate one or more signals responsive to conditions of the gas flow. For example, the sensor device can be configured to generate one or more signals indicative of a gas temperature or a gas flow rate.

In some embodiments, processing device 330 includes a central processing unit (CPU), microcontroller, a programmable logic controller (PLC), a system on a chip (SoC), a server computer, or other suitable type of computing device. Processing device 330 can be configured to execute programming instructions related to the operation of the valve assembly 310. Processing device 330 receives feedback signals from the sensor device and compute temperature, flow rate, and/or other parameters of the gas flow. Processing device 330 further transmits control signals to valve assembly 310 based on the received feedback signals. In some embodiments, processing device 330 is configured for high-speed feedback processing, and can include, for example, an EPM. In some embodiments, processing device 330 is configured to execute a process recipe, or one or more steps of a process recipe, for a fabrication process using the chamber 200. For example, the recipe may specify gas flows at particular flow rates to occur at specific times, for specific durations, and for specific gases. As another example, the recipe may specify pulses of one or more gases.

Figure 4A:
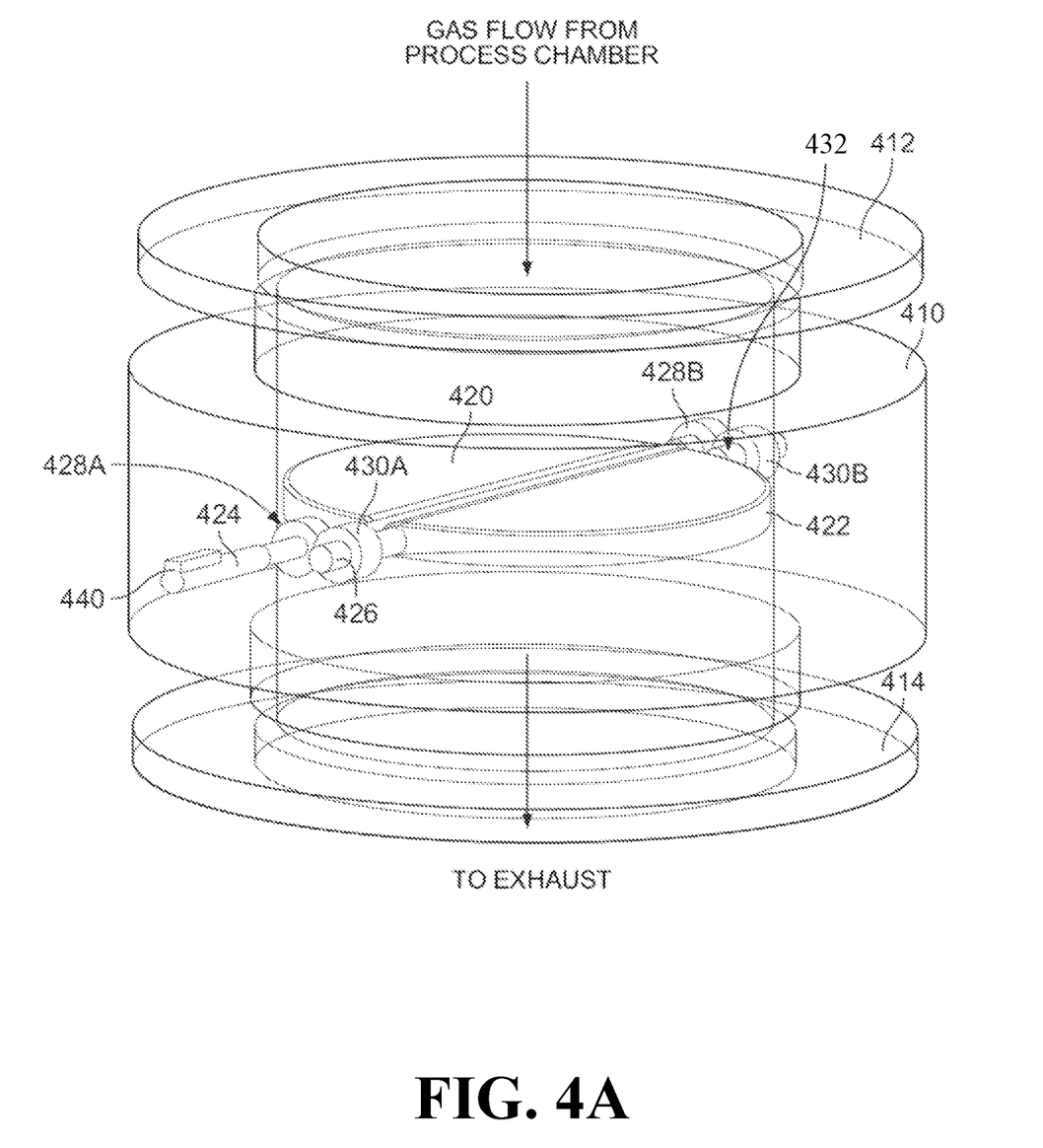
FIGS. 4A and 4B depict a valve assembly, in accordance with embodiments of the present disclosure.
Figure 4B:
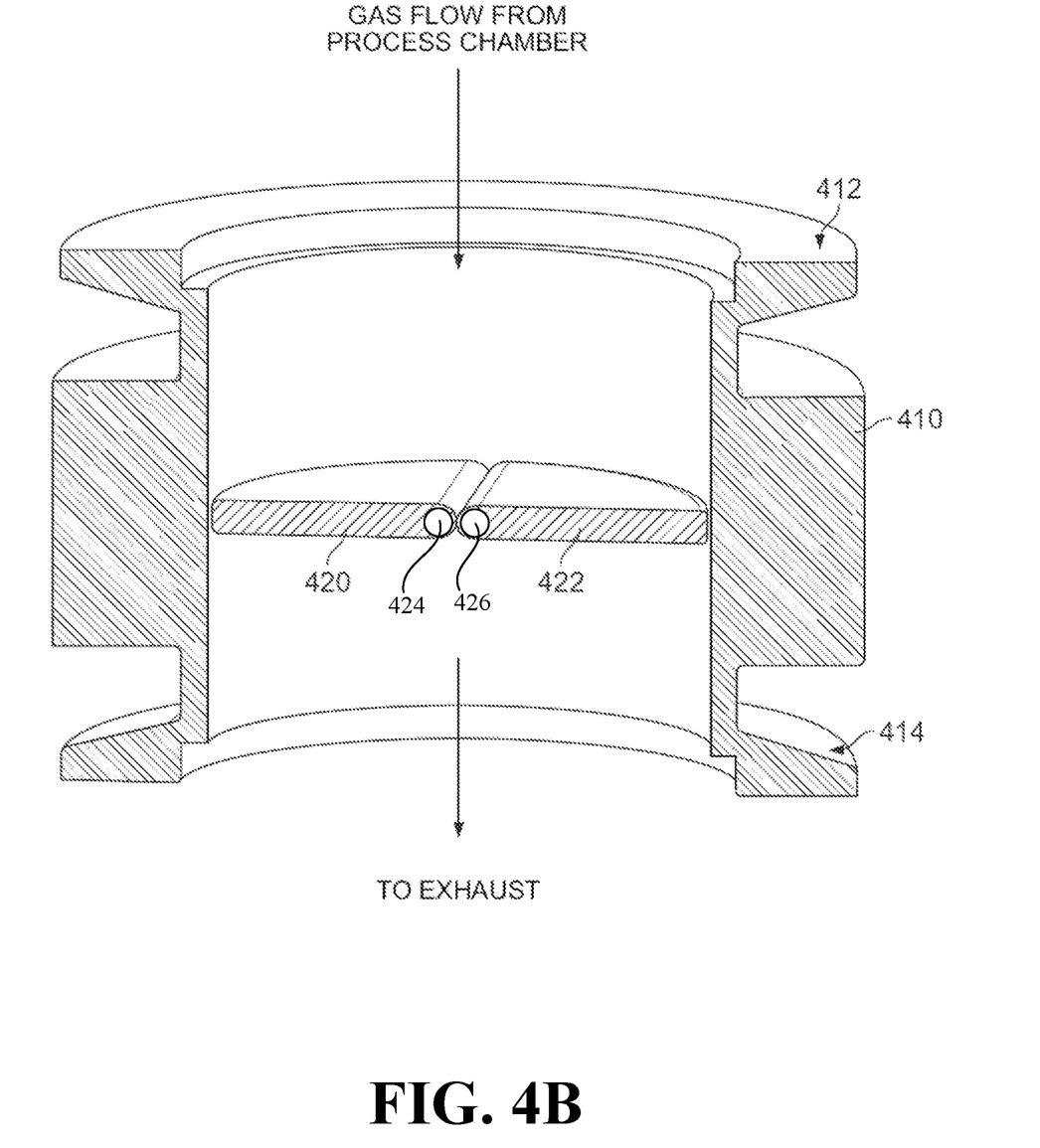

FIGS. 4A and 4B depict a valve assembly 400, in accordance with embodiments of the present disclosure. FIG. 4A is a general view of the valve assembly 400, in accordance with embodiments of the present disclosure. FIG. 4B is a cross-sectional schematic side view of the valve assembly 400, in accordance with embodiments of the present disclosure. In some embodiments, valve assembly 400 can correspond to valve assembly 310, described with respect to FIG. 3. Value assembly 400 can be positioned in a gas flow channel (e.g., gas flow channel 240). Valve assembly 400 can include housing 410, left flap 420, right flap 422, left shaft 424, and right shaft 426.

Housing 410 can have an outer shell and an inner shell which includes a through-bore or fluid passage way for allowing a flow path to traverse. Housing 410 can include a top flange 412 and a bottom flange 414. Each flange can be used to couple valve assembly 400 to a gas flow channel.

Left flap 420 and right flap 422 can be positioned within housing 410. Left flap 420 and right flap 422 can each be half circle shaped (e.g., a half disc), having a flat top and flat bottom, a half circle side, and a flat side. The flat sides of each flap 420, 422 can be rounded and proximate to each other such that the two flaps form a circular shape when valve assembly 400 is in the closed positon (to prevent flow through the gas flow channel). Each flap 420, 422 can be coupled to shaft 424, 426, respectively. Shafts 424, 426 can be coupled at or near the flat ends of each flap, where the axis of each shaft 424, 426 is parallel to a horizontal axis running longitudinal to the flat side of each flap 420, 422. Each end of each shaft 424, 426 can be coupled to housing 410 to enable each flap 420, 422 to rotate around the around the axis of each respect shaft 424, 426. In some embodiments, a coupling can be used to couple the shafts 424, 426 to housing 410. In some embodiments, a bearing(s) can be used to enable shafts 424, 426 to rotate while coupled to housing 410.

In some embodiments, a sealant is coupled to one or both ends of each shaft 424, 426 to prevent leakage of gas flow. Arrow 432 indicates one possible location for the sealant to be coupled to shaft 426. In some embodiments, the sealant includes an o-ring, a gasket, nano-technology rubber, or any other type of sealant capable of preventing gas flow leakage.

In some embodiments, shaft 424 can be coupled to gears 428A, 428B and shaft 426 can be coupled to gears 430A, 430B. Gears 428A and 430A can form a first gear assembly. Gears 428B and 430B can form a second gear assembly. The first and second gear assembly can symmetrically move left flap 420 and right flap 422 from a closed position to an open position, and vice versa. In some embodiments, the first and second gear assembly can include worm gear assemblies, spur gear assemblies, helical gear assemblies, double helical gear assemblies, bevel gear assemblies, any other type of gears and/or gear assemblies, or any combination thereof. In some embodiments, the gear assemblies include an anti-backlash features. For example, the gear assemblies can include worm gear assemblies designed to prevent backlash (i.e., lost motion caused by gaps between the gear teeth). In some embodiments, value assembly 400 can include a heating feature to heat valve assembly 400 to prevent buildup of chemicals on the flaps 420, 422 (or on any other element of the valve assembly 400) from the deposition process.

Shaft 424 can extend out from housing 410, and can include protrusion 440. Protrusion 440 can used to connect to an actuator. The actuator can include any mechanical, electrical, or electromechanical device capable of rotating shaft 424. For example, the actuator can include an electric motor, a pneumatic device, a hydraulic device, a magnetic device, a solenoid, and so forth. Protrusion 440 is used by way of example, and shaft 424 can be coupled with any feature or component required to connect to the actuator.

The actuator can rotate shaft 424 in either direction (i.e., clockwise and counterclockwise). Rotating shaft 424 can position valve assembly 400 into an open position (where both flaps 420, 422 are parallel to the flow path, such as flow path 342), into one or more partially open positions (where both flaps 420, 422 are between being parallel to the flow path and perpendicular to the flow path), and into a closed position (where both flaps 420, 422 are perpendicular to the flow path). In particular, rotating shaft 424 rotates left flap 420 and engages the first and second gear assembly to rotate right flap 422 in a symmetric motion (in a mirror motion via a vertical plane between left flap 420 and right flap 422). In some embodiments, the actuator is operated by processing device 330 and/or control system 128.

In some embodiments, valve assembly 400 can include a stop feature. A stop feature can be any mechanical, electrical, or electromechanical feature or component capable of preventing the flaps 420, 422 from rotating past a predetermined position. In an example, the stop feature can be a protrusion in the gear assemblies that physically prevents flaps 420, 422 from rotating past a predetermined position. In another example, the stop feature can be an electrical sensor that electrically prevents flaps 420, 422 from rotating past a predetermined position. In yet another example, the stop feature can be enabled by computer code that prevents flaps 420, 422 from rotating past a predetermined position.

Figure 5A:
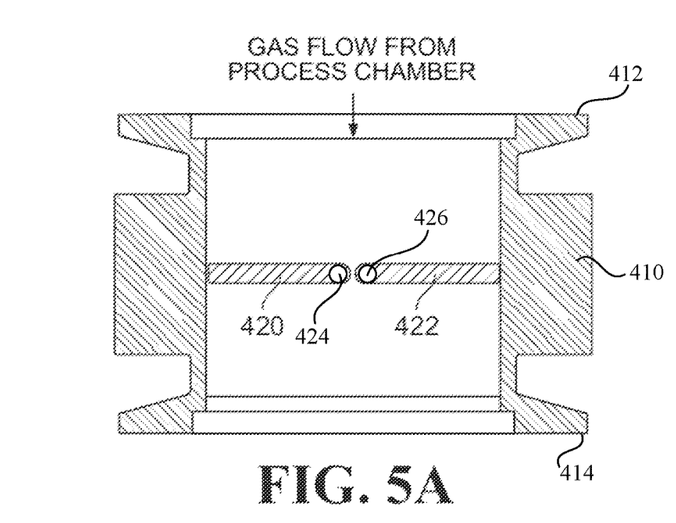
FIGS. 5A-5C depict cross-sectional schematic side views of different positions of the flaps of valve assembly, in accordance with embodiments of the present disclosure.
Figure 5B:
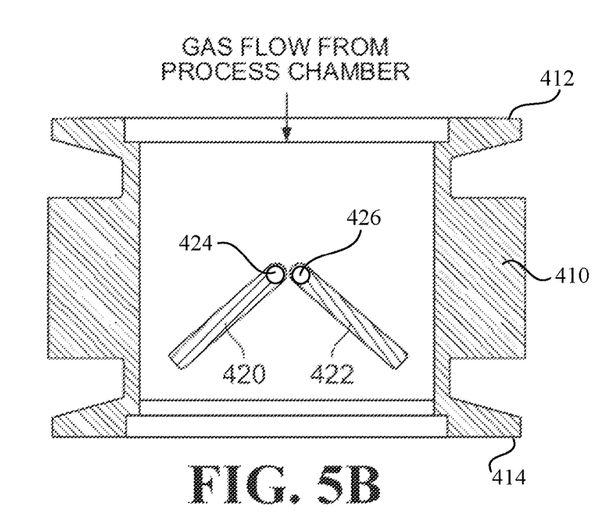
Figure 5C:
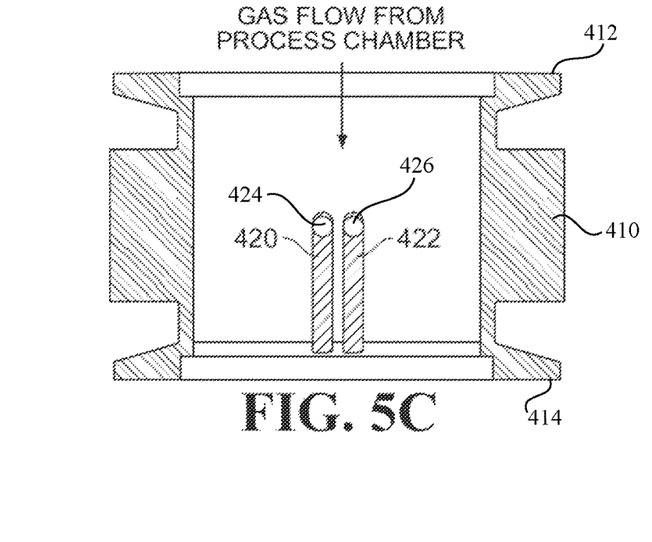
Figure 7:
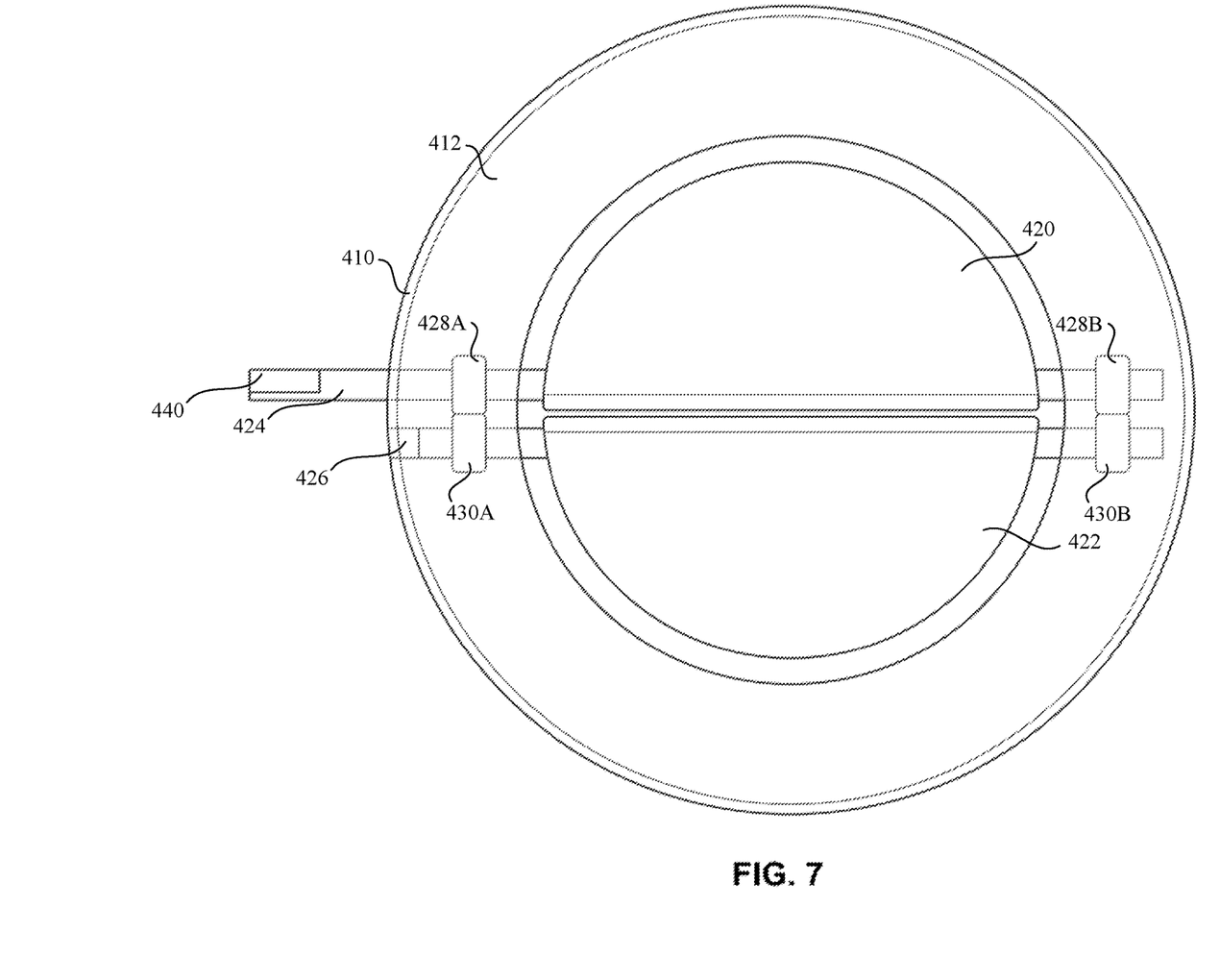
FIG. 7 depicts a schematic top view of a valve assembly, in accordance with embodiments of the present disclosure.

FIGS. 5A-5C depict cross-sectional schematic side views of different positions of the flaps of valve assembly 400, in accordance with embodiments of the present disclosure. FIG. 5A depicts the valve assembly 400 in the closed position. In particular, the flaps are positioned perpendicular to the flow path. FIG. 5B depicts the valve assembly 400 in a partially open position. In particular, the flaps are positioned at approximately a 45° angle to the flow path (and approximately at a 90° angle to each other). FIG. 5C depicts the valve assembly 400 in the open position. In particular, the flaps are positioned parallel to the flow path from the process chamber. It should be understood that the flaps can be positioned by the actuator into any position relevant to each other or to the gas flow. FIG. 7 depicts a schematic top view of valve assembly 400, in accordance with embodiments of the present disclosure.

Figure 6:
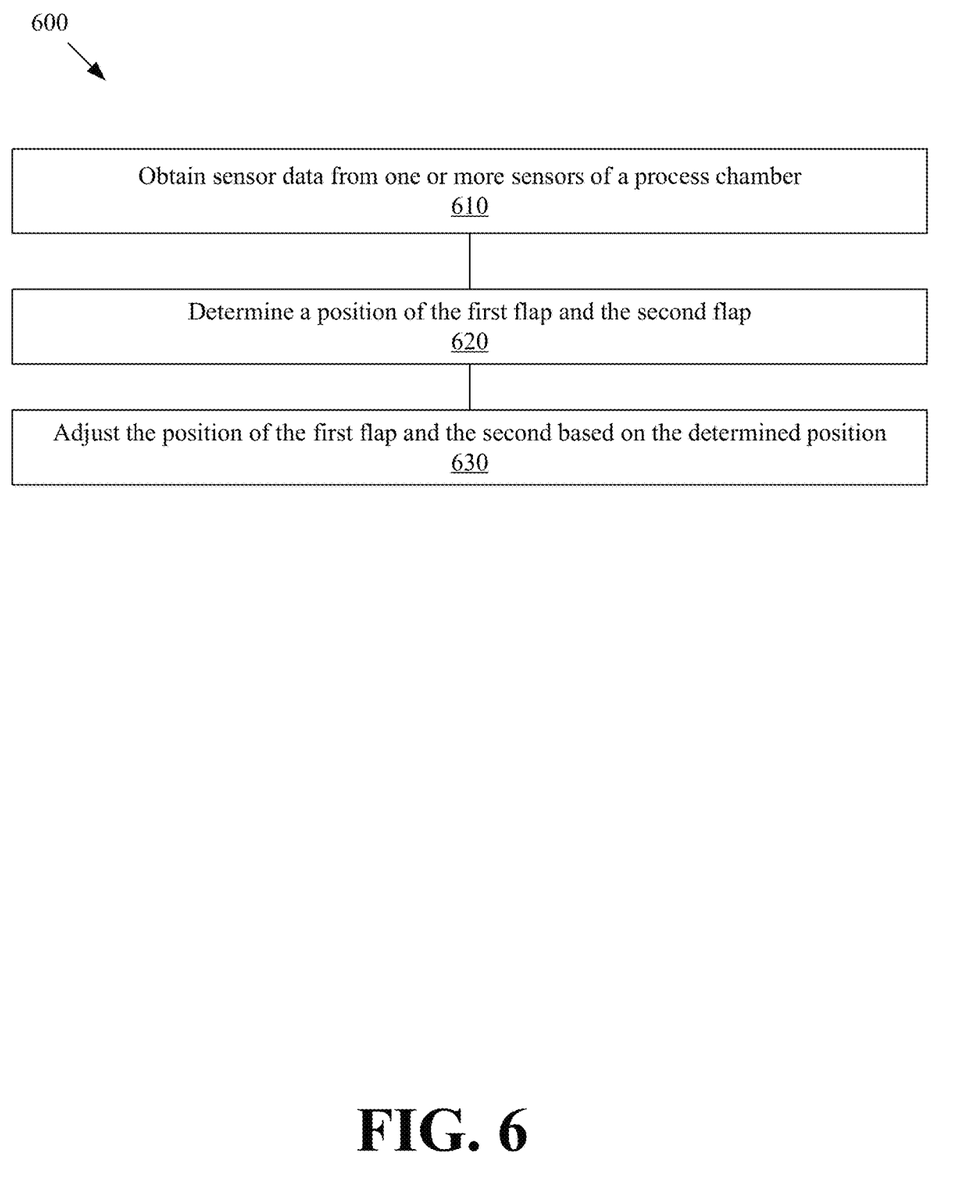
FIG. 6 is a flow chart of a method for controlling the valve assembly, according to aspects of the present disclosure.

FIG. 6 is a flow chart of a method 600 for controlling the valve assembly, according to aspects of the present disclosure. Method 600 is performed by processing logic that can include hardware (circuitry, dedicated logic, etc.), software (such as is run on a general purpose computer system or a dedicated machine), firmware, or some combination thereof. In one implementation, method 600 can be performed by a computer system, such as system controller 128 of FIG. 1 or processing device 330 of FIG. 3. In other or similar implementations, one or more operations of method 600 can be performed by one or more other machines not depicted in the figures.

At block 610, processing logic obtains sensor data from one or more sensors of a process chamber. For example, the one or more sensors can capture spectral data and/or non-spectral data for a portion of a substrate during a substrate process. Additionally, the one or more sensors can be configured to capture data associated with the environment within the process chamber before, after, or during the substrate process. For example, the one or more sensors can be configured to capture data associated with a temperature, a pressure, a gas concentration, etc. of the environment within the process chamber during the substrate process.

At block 620, the processing logic determines a position to set the first flap and the second flap based on the sensor data. For example, the processing logic can determine a position to set the first flap and the second flap to adjust the gas flow rate and/or pressure within the process chamber based on a recipe. In some embodiments, the processing logic can use a database or library containing data related to correlations between positions of the flaps and gas flow rate and/or pressure.

At block 630, the processing logic adjusts the position of the first flap and the second based on the determined position. For example, the processing logic can enable the actuator to adjust rotate the first flap and the second flap to the determined position. In some embodiments, the processing logic can perform additional adjustments based on feedback from the sensors to obtain an optimal position of the flaps.

The preceding description sets forth numerous specific details such as examples of specific systems, components, methods, and so forth in order to provide a good understanding of several embodiments of the present disclosure. It will be apparent to one skilled in the art, however, that at least some embodiments of the present disclosure can be practiced without these specific details. In other instances, well-known components or methods are not described in detail or are presented in simple block diagram format in order to avoid unnecessarily obscuring the present disclosure. Thus, the specific details set forth are merely exemplary. Particular implementations can vary from these exemplary details and still be contemplated to be within the scope of the present disclosure.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within ±10%.

What is claimed is:

1. A valve assembly comprising:
a housing comprising a flow path;
a first flap coupled to a first shaft and a second flap coupled to a second shaft, wherein the first shaft and the second shaft are coupled to the housing;
a first gear assembly situated outside the flow path and coupled to the first shaft and the second shaft at a first location proximate to a first end of the first shaft; and
a second gear assembly situated outside the flow path and coupled to the first shaft and the second shaft at a second location on the first shaft, wherein the second location is proximate to a second end, that is opposite to the first end, on the first shaft, wherein the first gear assembly and the second gear assembly are configured such that the first flap and the second flap rotate from a first position to a second position to prevent a flow from traversing through the flow path and from the second position to the first position to allow the flow to traverse through the flow path.

2. The valve assembly of claim 1, wherein the first flap and the second flap each comprise a half disc.

3. The valve assembly of claim 1, wherein the first shaft is coupled to an actuator configured such that the actuator rotates the first shaft.

4. The valve assembly of claim 1, further comprising:
a stop feature capable of preventing the first flap and the second flap from rotating past a predetermined position.

5. The valve assembly of claim 1, wherein the second position comprises the first flap and the second flap positioned parallel to the flow path.

6. An electronic device manufacturing system, comprising:
a process chamber; and
a flow control apparatus comprising a valve assembly, wherein the value assembly comprises;
a housing comprising a flow path;
a first flap coupled to a first shaft and a second flap coupled to a second shaft, wherein the first shaft and the second shaft are coupled to the housing;
a first gear assembly situated outside the flow path and coupled to the first shaft and the second shaft at a first location proximate to a first end of the first shaft; and
a second gear assembly situated outside the flow path and coupled to the first shaft and the second shaft at a second location on the first shaft, wherein the second location is proximate to a second end, that is opposite to the first end, on the first shaft, wherein the first gear assembly and the second gear assembly are configured such that the first flap and the second flap rotate from a first position to a second position to prevent a flow from traversing through the flow path and from the second position to the first position to allow the flow to traverse through the flow path.

7. The electronic device manufacturing system of claim 6, wherein the first flap and the second flap each comprise a half disc.

8. The electronic device manufacturing system of claim 6, wherein the first shaft is coupled to an actuator configured such that the actuator rotates the first shaft.

9. The electronic device manufacturing system of claim 6, further comprising:
a stop feature capable of preventing the first flap and the second flap from rotating past a predetermined position.

10. The electronic device manufacturing system of claim 6, wherein the second position comprises the first flap and the second flap positioned parallel to the flow path.

11. A flow control apparatus comprising:
a gas flow channel defining a gas flow path;
a valve assembly configured to modulate gas flow in the gas flow channel, the valve assembly comprising:
a housing comprising gas flow path;
a first flap coupled to a first shaft and a second flap coupled to a second shaft, wherein the first shaft and the second shaft are coupled to the housing;
a first gear assembly situated outside the gas flow path and coupled to the first shaft and the second shaft at a first location proximate to a first end of the first shaft; and
a second gear assembly situated outside the gas flow path and coupled to the first shaft and the second shaft at a second location on the first shaft, wherein the second location is proximate to a second end, that is opposite to the first end, on the first shaft, wherein the first gear assembly and the second gear assembly are configured such that the first flap and the second flap rotate from a first position to a second position to prevent a flow from traversing through the gas flow path and from the second position to the first position to allow the flow to traverse through the gas flow path.

12. The flow control apparatus of claim 11, wherein the first flap and the second flap each comprise a half disc.

13. The flow control apparatus of claim 11, wherein the first shaft is coupled to an actuator configured such that the actuators rotates the first shaft.

14. The flow control apparatus of claim 11, further comprising:
a stop feature capable of preventing the first flap and the second flap from rotating past a predetermined position.

15. A method of manufacturing a valve assembly, the method comprising:
providing a housing comprising a flow path;
coupling a first flap to a first shaft;
coupling a second flap to a second shaft;
coupling the first shaft and the second shaft to the interior of the housing; and
coupling a first gear assembly outside the flow path and to the first shaft and the second shaft at a first location proximate to a first end of the first shaft; and
coupling a second gear assembly outside the flow path and to the first shaft and the second shaft at a second location on the first shaft, wherein the second location is proximate to a second end, that is opposite to the first end, on the first shaft, wherein the first gear assembly and the second gear assembly are configured such that the first flap and the second flap rotate from a first position to a second position to prevent a flow from traversing through the flow path and from the second position to the first position to allow the flow to traverse through the flow path.

* * * * *